US012288925B2

(12) United States Patent
Schäuble et al.

(10) Patent No.: US 12,288,925 B2
(45) Date of Patent: Apr. 29, 2025

(54) APPARATUS FOR TRANSFERRING SIGNALS FROM AN AT LEAST PARTIALLY METALLIC HOUSING

(71) Applicant: Endress+Hauser SE+Co. KG, Maulburg (DE)

(72) Inventors: Harald Schäuble, Lörrach (DE); Thomas Blödt, Steinen (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 584 days.

(21) Appl. No.: 17/275,709

(22) PCT Filed: Aug. 13, 2019

(86) PCT No.: PCT/EP2019/071656
§ 371 (c)(1),
(2) Date: Mar. 12, 2021

(87) PCT Pub. No.: WO2020/052885
PCT Pub. Date: Mar. 19, 2020

(65) Prior Publication Data
US 2022/0037760 A1 Feb. 3, 2022

(30) Foreign Application Priority Data
Sep. 13, 2018 (DE) ..................... 10 2018 122 423.0

(51) Int. Cl.
*H01Q 1/22* (2006.01)
*H01Q 1/00* (2006.01)
(Continued)

(52) U.S. Cl.
CPC ........... *H01Q 1/2233* (2013.01); *H01Q 1/002* (2013.01); *H01Q 1/44* (2013.01); *H01Q 13/10* (2013.01)

(58) Field of Classification Search
CPC ....................... H01Q 1/2233; H01Q 13/10–18
See application file for complete search history.

(56) References Cited

U.S. PATENT DOCUMENTS 6,798,385 B2 * 9/2004 Kirino .................. H01Q 1/2275 343/702
2003/0146875 A1 * 8/2003 Kirino ...................... H01Q 1/44 343/702
(Continued)

FOREIGN PATENT DOCUMENTS

CN 1776963 A 5/2006
CN 1949594 A 4/2007
(Continued)

*Primary Examiner* — Ab Salam Alkassim, Jr.
(74) *Attorney, Agent, or Firm* — Mark A. Logan; Endress+Hauser (USA) Holding, Inc.

(57) ABSTRACT

An apparatus for transferring signals from an at least partially metallic housing with the aid of electromagnetic waves of a particular wavelength comprises a transmitter/receiver unit located in the housing for generating and receiving the electromagnetic waves; at least one primary antenna located in the housing for coupling out the generated electromagnetic waves from the transmitter/receiver unit and for coupling in and transferring received electromagnetic waves to the transmitter/receiver unit; at least one slot-shaped housing opening designed such that a length of the slot-shaped housing opening is an integer multiple of a quarter of the particular wavelength and such that the slot-shaped housing opening, in cooperation with the primary antenna, transfers the signals with the aid of the electromagnetic waves into or out of the housing.

13 Claims, 3 Drawing Sheets

(51) Int. Cl.
*H01Q 1/44* (2006.01)
*H01Q 13/10* (2006.01)

(56) References Cited

U.S. PATENT DOCUMENTS

| | | | | |
|---|---|---|---|---|
| 2008/0280568 | A1* | 11/2008 | Kielb | G01D 21/00 340/12.3 |
| 2009/0311976 | A1* | 12/2009 | Vanderaa | G08C 17/04 455/90.3 |
| 2010/0259101 | A1* | 10/2010 | Micallef | G01D 21/00 307/26 |
| 2012/0060600 | A1* | 3/2012 | Reimelt | H01Q 13/02 73/290 V |
| 2012/0268343 | A1* | 10/2012 | Yanagi | H01Q 9/20 343/872 |
| 2013/0244739 | A1 | 9/2013 | Arkko et al. | |
| 2014/0088893 | A1* | 3/2014 | McGuire | H02S 50/00 702/58 |
| 2015/0270618 | A1* | 9/2015 | Zhu | H01Q 1/243 343/702 |
| 2015/0278560 | A1* | 10/2015 | Blodt | G06K 7/10009 340/10.1 |
| 2016/0079677 | A1* | 3/2016 | Denis | B23K 37/00 29/601 |
| 2018/0034129 | A1* | 2/2018 | Blödt | H01Q 9/36 |
| 2020/0166411 | A1* | 5/2020 | Mårtensson | G01K 1/024 |
| 2020/0185812 | A1* | 6/2020 | Schäuble | H01Q 1/2233 |
| 2021/0372834 | A1* | 12/2021 | Lim | G01F 1/586 |
| 2022/0049984 | A1* | 2/2022 | Winfried | H01Q 13/02 |
| 2022/0200155 | A1* | 6/2022 | Blödt | H01Q 1/3233 |
| 2022/0326672 | A1* | 10/2022 | Gerwig | G05B 19/042 |

FOREIGN PATENT DOCUMENTS

| | | | | |
|---|---|---|---|---|
| CN | 101084604 | A | 12/2007 | |
| CN | 101542833 | A | 9/2009 | |
| CN | 103219592 | A | 7/2013 | |
| CN | 104347953 | A | 2/2015 | |
| CN | 105122544 | A | 12/2015 | |
| CN | 107004941 | A | 8/2017 | |
| DE | 102009047535 | A1 | 6/2011 | |
| EP | 3016201 | A1 * | 5/2016 | H01Q 1/38 |
| JP | 2017152951 | A | 8/2017 | |
| WO | WO-2016082958 | A1 * | 6/2016 | |

* cited by examiner $$U_1 = n_1 \cdot \frac{\lambda}{2} \cdot \frac{1}{\sqrt{DC}}$$

$$U_2 = n_2 \cdot \frac{\lambda}{2} \cdot \frac{1}{\sqrt{DC}}, where\ n_1, n_2 \in N$$

APPARATUS FOR TRANSFERRING SIGNALS FROM AN AT LEAST PARTIALLY METALLIC HOUSING

CROSS-REFERENCE TO RELATED APPLICATIONS

The present application is related to and claims the priority benefit of German Patent Application No. 10 2018 122 423.0, filed on Sep. 13, 2018 and International Patent Application No. PCT/EP2019/071656, filed on Aug. 13, 2019, the entire contents of which are incorporated herein by reference.

TECHNICAL FIELD

The invention relates to an apparatus for transferring signals from an at least partially metallic housing with the assistance of electromagnetic waves of a particular wavelength, a field device adapter for wireless data transmission, and an automation technology field device.

BACKGROUND

In automation technology—in particular, in process automation technology—field devices, which serve for the determination, optimization, and/or influencing of process variables, are widely used. Sensors, such as fill-level measuring devices, flow meters, pressure and temperature measuring devices, conductivity measuring devices, etc., are used for capturing the respective process variables, such as fill-level, flow rate, pressure, temperature, or conductivity. For influencing process variables, actuators, such as, for example, valves or pumps, are used, by which the flow rate of a fluid in a pipeline section or a fill-level in a container can be altered. Field devices, in principle, refer to all devices which are used in proximity to the process and which supply or process process-relevant information. In the context of the invention, field devices are also understood to be remote I/O's and, in general, devices that are arranged at the field level. A variety of such field devices are manufactured and marketed by the Endress+Hauser company.

Two-wire field devices, which are connected via a two-wire line to a higher-order unit, e.g., a control unit PLC, are still common at the present time in a large number of existing automation systems. Two-wire field devices are constructed in such a way that the measurement or control values are communicated, i.e., transmitted, as the main process variable in analog form via the two-wire line or two-wire cable as a 4-20 mA signal. The HART protocol, in which, on the analog current signal of 4-20 mA, a frequency signal is superimposed as a digital two-wire signal for data transmission, has, especially, proven successful for transmitting all other data. According to the HART protocol, there is a switch between 1,200 Hz and 2,400 Hz for data transmission, wherein the lower frequency stands for a logical "0" and the higher frequency for a logical "1." In this way, the analog current signal, which changes only slowly, is unaffected by the frequency superposition, so that, by means of HART, analog and digital communication is combined.

Over the course of increasing digitization, however, it is desirable that the data be able to be transferred not only via the two-wire line, i.e., purely wire-bound, but also communicated wirelessly with the assistance of electromagnetic waves. This may be for transferring the data wirelessly to a database, e.g., a cloud database, and making it available there, or for transferring data wirelessly between the field device and a mobile control unit, e.g., in order to parametrize or configure the field device wirelessly via the mobile control device.

For this purpose, so-called field device adapters for wireless data transmission are used more and more frequently, with the aid of which it is possible to retrofit the existing field devices for wireless data transmission. Such field device adapters can be integrated directly into the two-wire line. That is, the field device adapter is connected more-or-less as an independent unit between the higher-order unit and the field device. Alternatively, the field device adapter can also be mechanically connected directly to the field device, e.g., via a cable gland, and electrically connected to field device electronics.

Since the field device adapters or the field devices are often used in sectors in which there is a potential explosion risk, the use of metallic housings or metal housings is mandatory. However, these generally do not permit the emission of waves for wireless data transmission. Possible add-on parts on the field device adapters or the field devices, such as external rod antennas, for example, constitute weak points for the housing and are therefore avoided.

The invention is therefore based upon the aim of proposing an apparatus in which the transfer of signals with the aid of electromagnetic waves is possible even with metallic housings.

SUMMARY

The apparatus according to the invention for transferring signals from an at least partially metallic housing with the aid of electromagnetic waves of a particular wavelength, comprising:

- a transmitting/receiving unit, arranged in the housing, for generating and receiving the electromagnetic waves,
- at least one primary antenna, arranged in the housing, for coupling out the generated electromagnetic waves of the transmitting/receiving unit and for coupling in and transferring received electromagnetic waves to the transmitting/receiving unit,
- at least one, slot-shaped housing opening that is constructed such that a length of the slot-shaped housing opening corresponds to an integer multiple of a quarter wavelength of the particular wavelength—preferably an integer multiple of a half wavelength of the particular wavelength—so that the slot-shaped housing opening, in cooperation with the primary antenna, transfers the signals into or out of the housing with the aid of electromagnetic waves.

According to the invention, for emitting or receiving electromagnetic waves from or in a metallic housing, an antenna is proposed that comprises a primary antenna or primary radiator and a secondary antenna or a secondary radiator, wherein the secondary antenna or the secondary radiator is constructed in the form of a slot-shaped housing opening whose length corresponds to the following condition:

$$L=n\cdot\lambda/4,$$

where the following holds true:

$\lambda$=wavelength of the electromagnetic wave with which the signals are transferred, and $n\in N$.

The at least one, slot-shaped housing opening is selected in particular to be small, such that a transmission of electromagnetic waves having a very low frequency, i.e., frequencies significantly less than 1 GHz—preferably frequencies in the range of 1 kHz-100 MHz—which can lead to EMC interference, are not transmitted. This means that the slot-shaped housing opening acts more-or-less as a high-pass filter for electromagnetic waves and allows only waves intended for the transmission of signals to pass through. For transferring signals with the aid of the electromagnetic waves, waves with a frequency or a frequency band of 2.4 GHz are usually provided. WLAN according to IEEE 802.11b and g, Bluetooth (IEEE 802.15.1), and ZigBee (IEEE 802.15.4) belong, in this context, to the most prominent representatives of the 2.4 GHz category. Further communication technologies based upon the IEEE 802.15.4 specification are, for example, 6 LoWPAN, 6TiSCH, or ANT or ANT+. From this point of view, a preferred length of the at least one, slot-shaped housing opening of a half wavelength of $2/4\lambda=\lambda/2\cong 12.43$ cm results for electromagnetic waves with a frequency of 2.4 GHz.

In order to prevent interference—in particular, EMC interference—of electronics arranged within the housing, the length of the slot-shaped housing opening L may be selected in particular such that, further, the condition $n\cdot\lambda$ does not apply to a frequency of the electronics interference ($f_{Stör}=c/\lambda_{Stör}$, where c corresponds to the speed of light)—in particular, EMC interference—but to the particular wavelength $\lambda$ used for transmission. Furthermore, in order to avoid strong interference, i.e., interference which entails an apparatus failure, the length of the slot-shaped housing opening L may, in particular, also be selected such that the condition $(n+0.5)\cdot\lambda/4$ does not apply to a frequency of the strong interference.

The housing is a substantially metallic housing. The housing can have, for example, a metallic housing surface section of at least 85%, preferably at least 90%, particularly preferably at least 95%, and very particularly preferably at least 99%, based upon an overall surface of the housing.

An advantageous embodiment of the apparatus according to the invention provides that the at least one, slot-shaped housing opening be at least partially filled with an electrically non-conductive material, wherein the at least one, slot-shaped housing opening is at least partially filled with an electrically non-conductive material, wherein the slot-shaped housing opening is preferably constructed such that the length of the slot-shaped housing opening corresponds to an integer multiple of the quarter wavelength of the particular wavelength divided by a square root of a dielectric constant of the electrically non-conductive material—preferably an integer multiple of a half wavelength of the particular wavelength divided by the square root of the dielectric constant.

A further advantageous embodiment of the apparatus according to the invention provides that the housing, with the exception of the at least one, slot-shaped housing opening and possible cable infeeds and/or outfeeds, have a housing shape that is, on the outside, self-contained.

A further advantageous embodiment of the apparatus according to the invention provides that, at least in one section, the housing have round edges in cross-section—preferably a round housing shape—wherein the at least one, slot-shaped housing opening is arranged in the section.

A further advantageous embodiment of the apparatus according to the invention provides that the housing be constructed in such a way that at least two circumferences measured in two spatial directions each correspond to an integer multiple of a half wavelength of the particular wavelength, wherein the measured circumferences each pass through the slot-shaped housing opening—preferably a midpoint of the housing opening. A corresponding embodiment of the housing ensures that the HF energy is distributed on the individual "circumferences" of the housing in such a way that, overall, a uniform emission pattern is produced. In particular, in order to locally delay the round-trip time of a wave and thereby significantly improve the emission pattern in almost all spatial directions, the embodiment can provide that, on an outer surface of the housing, at least one round-trip delay element be constructed to delay the electromagnetic waves by one round-trip time, and/or that the at least one round-trip delay element have a groove-shaped or a punctiform structure, or be constructed from a different material than the housing—preferably a dielectric material or a high-frequency metamaterial.

A further advantageous embodiment of the apparatus according to the invention provides that the at least partially metallic housing be constructed substantially from a metallic material.

An embodiment of the apparatus according to the invention alternative to this provides that the at least partially metallic housing be constructed from a plastic, and that the housing at least partially have a metallic cladding—preferably on an inner surface.

Another advantageous embodiment of the apparatus according to the invention further comprises a printed circuit board which is arranged within the housing and, as a primary antenna for coupling out the generated electromagnetic waves of the transmitting/receiving unit and for coupling in and transferring received electromagnetic waves, is constructed in such a way the electromagnetic waves are coupled out or coupled in laterally from the printed circuit board. In particular, the embodiment can provide that the printed circuit board be further constructed as a primary antenna in such a way that the electromagnetic waves are coupled out or coupled in only in a near field and are coupled in or coupled out in a far field only in combination with the at least one, slot-shaped housing opening. Such an embodiment offers the advantage that, here, no complete and thus complex antenna, such as is known, for example, from the prior art in Vivaldi antennas, is necessary. Rather, a primary antenna is sufficient which radiates only into the near field and which acts as a complete antenna only with the aid of the slot-shaped housing opening as a secondary radiator.

The invention further relates to a field device adapter for wireless data transmission, comprising an apparatus according to one of the previously described embodiments, wherein an adapter housing of the field device adapter comprises the housing.

The invention further relates to an automation technology field device comprising an apparatus according to one of the above-described embodiments, wherein a field device housing of the field device, at least in one section, comprises the housing.

An advantageous embodiment of the field device according to the invention provides that the section comprise at least one cable feedthrough of the field device.

BRIEF DESCRIPTION OF THE DRAWINGS

The invention is explained in more detail based upon the following drawings. Shown are.

DETAILED DESCRIPTION

Figure 1:
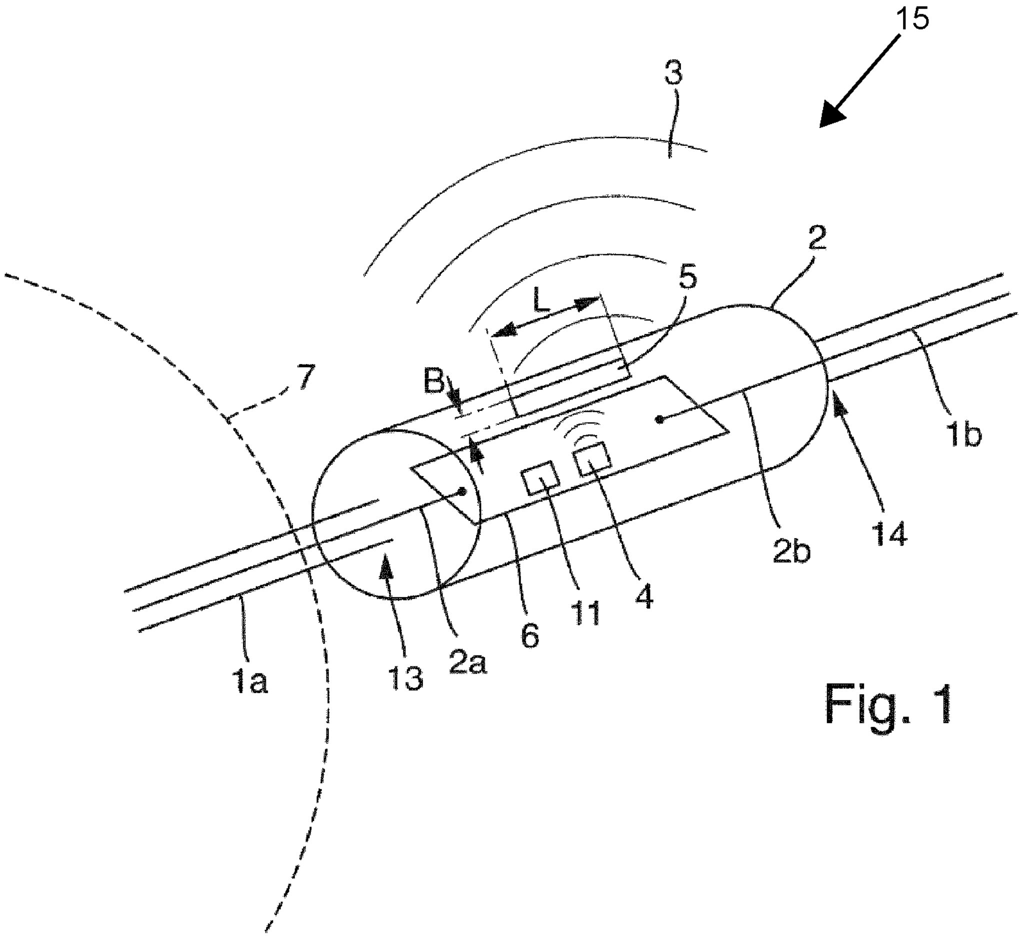
FIG. 1 shows a schematic representation of a first embodiment of an apparatus according to the present disclosure.
Figure 2:
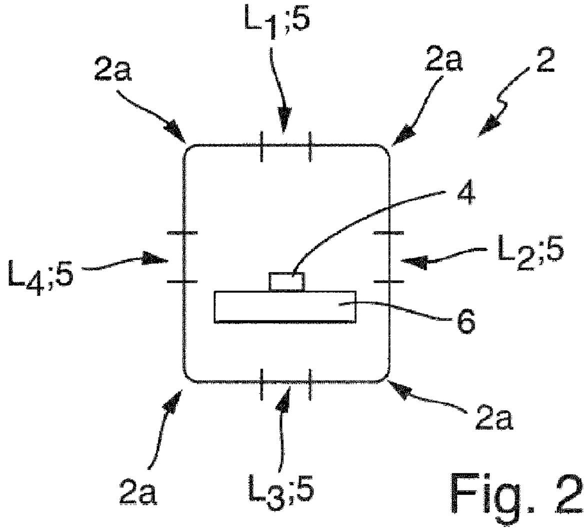
FIG. 2 shows a schematic representation of a cross-section through a housing of a second embodiment of the apparatus according to the present disclosure, which has several slot-shaped housing openings.

FIG. 1 shows a schematic representation of a first embodiment of an apparatus according to the invention. The apparatus comprises a housing 2 which is substantially made of a metal—preferably a stainless steel. Alternatively, however, the housing 2 can also be made of a plastic and be lined with a metallic layer—preferably on its inner surface. The housing 2 is, geometrically, constructed in such a way that, on the outside, it has a self-contained shape. It goes without saying that this does not concern possible cable infeeds and/or outfeeds 13, 14, as well as a housing opening 5 constructed according to the invention. At the end faces of the cylindrical housing 2, a cable infeed or a cable outfeed exits, via which a cable with at least one signal line 2*a*, 2*b* is guided into the housing or out of the housing 2. In the embodiment shown in FIG. 1, the housing 2 has a housing shape which is substantially cylindrical in cross-section. Alternatively, the housing 2 can also have other shapes, however. The housing 2 can preferably have a housing shape with round edges, as shown in FIG. 2.

Arranged in the housing 2 is a printed circuit board 6 which the cable 1*a*, 1*b* with the signal line 2*a*, 2*b* leads to or exits from. The printed circuit board 6 comprises a transmitting/receiving unit 11 for generating and receiving electromagnetic waves. The transmitting/receiving unit 11 can, for example, be an HF modem constructed in the form of a chip. The printed circuit board further comprises a primary antenna 4 for coupling out the generated electromagnetic waves and for coupling in and transmitting the received electromagnetic waves. The transmitting/receiving unit 11 shown in FIG. 1 is configured for generating or receiving electromagnetic waves having a frequency band of 2.4 GHz so that signals transmitted via the signal line 2*a*, 2*b* can also be transmitted wirelessly by the apparatus using Bluetooth (possibly also Bluetooth Low Energy) or one of the aforementioned variants.

According to the invention, the housing 2 has an (unfilled) slot-shaped opening 5 which has a length L that corresponds to an integer multiple of a quarter wavelength $n \cdot \lambda/4$ of the electromagnetic wave. In this embodiment, the opening is not filled with a material other than air. At a frequency of 2.4 GHz, the slot-shaped housing opening 5 thus has a preferred length of 12.43 cm, which corresponds approximately to a half wavelength ($2 \cdot \lambda/4$) of the electromagnetic waves. The width B of the slot-shaped opening 5 is selected to be as small as possible and is essentially determined by an appropriate manufacturing method. The width B is preferably less than 3 mm—particularly preferably less than 1 mm. The slot-shaped opening 5 has no electrical connection to the printed circuit board 6 and is irradiated by the primary antenna 4 located inside the housing 2.

The apparatus shown in FIG. 1 is connected at one end face via the cable 1*a* to a field device 7, and via the other end face by the cable 1*b* to a higher-order unit (not shown separately), wherein the cable 1*a*, 1*b* is a two-wire line, and one line of the two-wire line comprises the signal line 2*a*, 2*b*. The other line of the two-wire line is looped through by the printed circuit board 6. Via the two-wire line, for example, the measurement or control values as the main process variable are transmitted in analog form as a 4-20 mA signal between the field device and the higher-order unit. All other data—in particular, data relating to parameterization, diagnosis or the like—are transmitted via the two-wire line using the HART protocol. By means of the apparatus incorporated in the two-wire line, the data transmitted by wire using the HART protocol, in particular, can thus also be transmitted wirelessly with the aid of electromagnetic waves—for example, to a cloud. In this case, the apparatus thus represents a field device adapter 15 for wireless data transmission. FIG. 1 shows schematically the field device adapter 15.

Alternatively, unlike the example shown in FIG. 1, the apparatus can also be fastened mechanically directly to an (existing) field device—for example, by screwing. Fastening is preferably accomplished by a screw thread on the field device housing, which thread was originally provided for fastening a cable feedthrough or strain relief (a so-called PG (Panzergewinde, or armored thread)). In this case, the apparatus serves as an adapter (also called a dongle)—in particular, a Bluetooth adapter—by means of which a field device 7, which was originally not set up for wireless data transmission, can subsequently be retrofitted or supplemented for this purpose.

Figure 6:
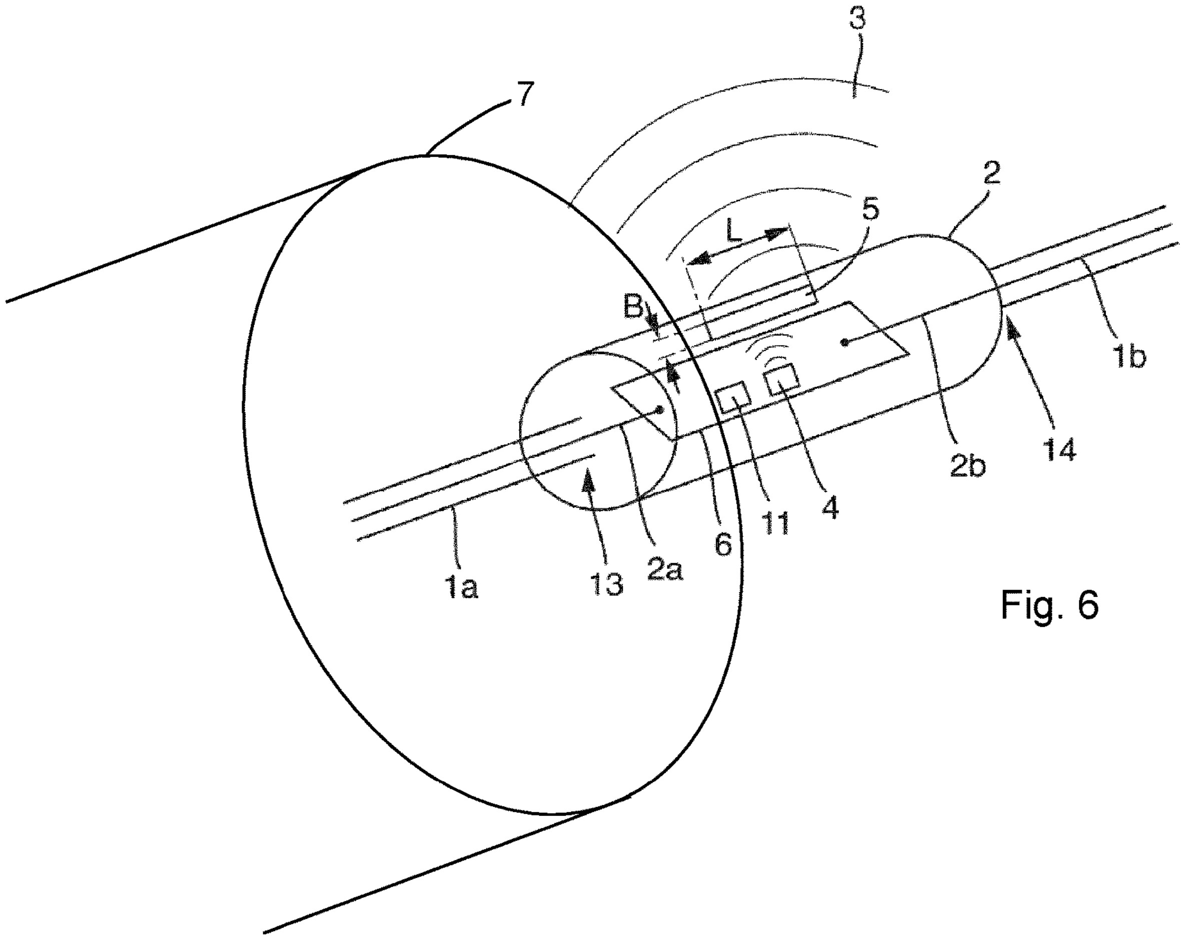
FIG. 6 shows a schematic representation of a field device incorporating the apparatus according to an embodiment of the present disclosure.

The apparatus—again, unlike the example shown in FIG. 1—can also be constructed as a part of the field device 7. In this case, the field device housing has at least one, slot-shaped housing opening 5—at least in one section. For example, the field device housing can be constructed in such a way that it has at least one protruding—in particular, cylindrical—extension the contour of which can correspond to, for example, the housing 2 shown in FIG. 1, and which has at least one slot-shaped opening 5 designed according to the invention. Such a field device 7 having a cylindrical extension 2 is shown in FIG. 6.

FIG. 2 shows a cross-section through a housing 2 of a second embodiment in which the housing of the apparatus has several slot-shaped openings. In this regard, two or four slot-shaped openings 5 in the housing 2 have proven to be particularly preferable. In order to achieve the most uniform possible emission from the housing 2, the slot-shaped housing openings 5 can additionally each have different lengths L1 through L4, depending upon the installation position and/or design of the primary antenna 4, wherein, for the length of each slot-shaped housing opening, independent of the other lengths, the following applies:

$$L = n \cdot \lambda/4,$$

with:

$\lambda$=wavelength of the electromagnetic wave which transmits the signals at a frequency of 2.4 GHz, and $n \in N$.

Figure 3:
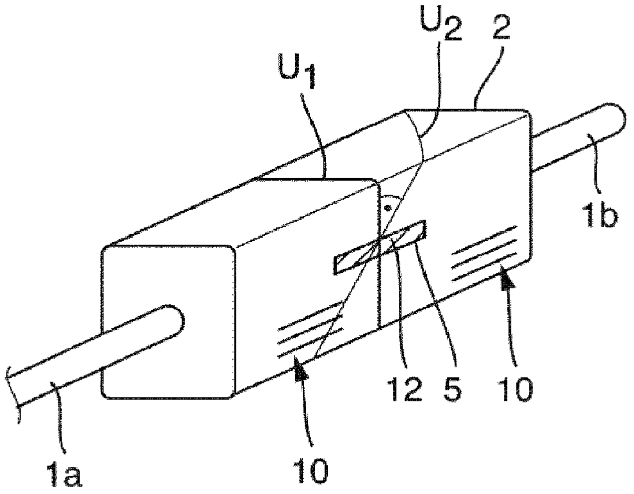
FIG. 3 shows a schematic representation of a third embodiment of the apparatus according to the present disclosure.

FIG. 3 shows a schematic representation of a third embodiment of the apparatus according to the invention, wherein the housing 2 has a slot-shaped opening 5. In order to be able to also use the apparatus in areas in which a potential explosion risk exists (so-called Ex regions), the slot-shaped opening 5 is filled with a material other than air—in particular, an electrically non-conductive material such as glass. It goes without saying that, in the event that the housing 2 has several slot-shaped openings 5, each opening is filled with an electrically non-conductive material. It should be noted here that, for the configuration of the length of the (filled) slot-shaped housing opening, a dielectric constant DC or (material-dependent) relative permittivity of the electrically non-conductive material used for filling must be included. This means that the length L of the (filled) slot-shaped housing opening corresponds to an integer multiple of a quarter wavelength of the particular wavelength divided by the square root of the dielectric constant DC ($L=n\cdot\lambda/(4\cdot\sqrt{(DC)})$)—preferably an integer multiple of a half wavelength of the particular wavelength divided by the square root of the dielectric constant DC ($L=n\cdot\lambda/(2\cdot\sqrt{(DC)})$). When using an electrically non-conductive material having a dielectric constant DC=4, a length L=6.25 cm, for example, thus results, instead of the previously described length of L=12.43 cm for an unfilled, slot-shaped housing opening. Ceramics having a dielectric constant within a range of about 30-40 have proven to be particularly suitable as electrically non-conductive materials.

Additionally or alternatively, as shown in FIG. 3, the housing can, geometrically, be constructed in such a way that at least two outer circumferences, measured in two, extensive, spatial directions, of the housing—preferably the outer circumferences in each spatial direction of the housing—correspond to an integer multiple of a half wavelength λ/2 of the electromagnetic wave with which the signals are transmitted. In this case, the circumferences are measured or determined in such a way that they each pass through the slot-shaped housing opening. The circumferences preferably run through a midpoint of the respective slot-shaped housing opening.

Figure 4A:
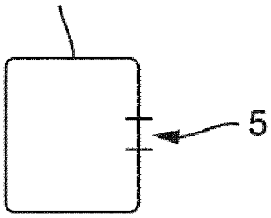
FIG. 4 shows the circumferences U1 and U2 shown in perspective in FIG. 3 in a plane to clarify the operating principle of the delay elements and/or a preferred geometric embodiment of a housing of the apparatus according to the present disclosure.
Figure 4B:
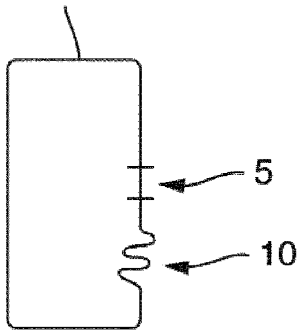

In order to clarify the circumferences U1 and U2 shown in perspective in FIG. 3, they are again shown in a plane in FIG. 4 *a*) and *b*). It can be seen from FIG. 4 that each circumference U1 and U2 passes through the slot-shaped housing opening 5. It goes without saying that, in the case that the housing 2 has several slot-shaped openings 5, the circumferences are defined such that each circumference runs through each slot-shaped opening 5 of the housing.

In order to locally delay a round-trip time of a wave, one or more round-trip delay elements 10 may be constructed on an outer surface of the housing 2, which delay elements are constructed such that a corresponding round-trip is increased. In FIG. 3, by way of example, two delay elements 10 are mounted on the housing surface. The delay elements 10 shown in FIG. 3 are constructed as groove-shaped elements. However, punctiform elements or elements which are constructed from a different material than the housing 2—in particular, a dielectric material or a high-frequency metamaterial—are also conceivable. By appropriate positioning, as can be seen from FIG. 4 *b*), the circumference can be changed—in particular, increased—in a targeted manner in one or more spatial directions. It should be noted that, depending upon the structural size of the round-trip delay elements, an HF round-trip path is generally slightly smaller than the (mechanical) circumference, since the electromagnetic wave in particular partially passes over small structures, and the interaction of the E and H field results in an overall slight "shortening."

Figure 5:
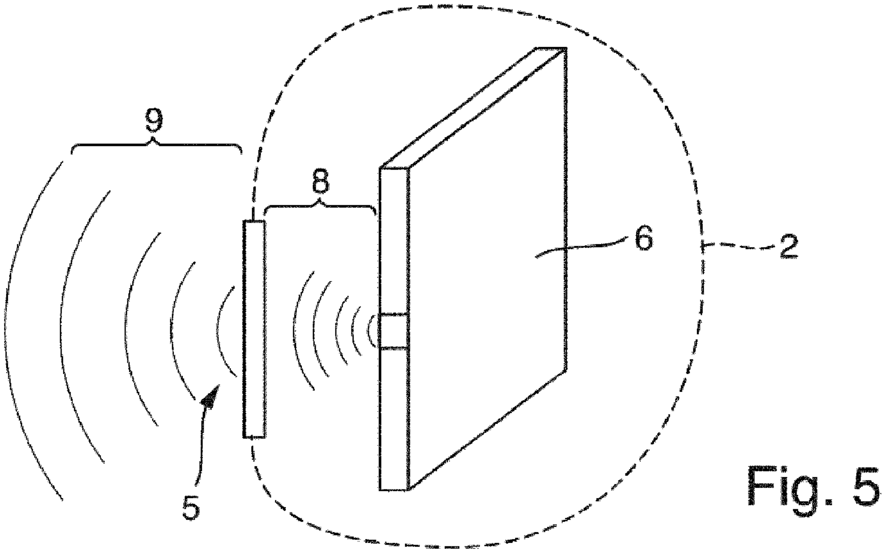
FIG. 5 shows a schematic representation of a fourth embodiment of the apparatus according to the present disclosure.

FIG. 5 shows a schematic representation of a fourth embodiment of the apparatus according to the invention in which, in addition or alternatively to the above-described embodiments, the printed circuit board 6 is constructed such that the electromagnetic waves are laterally coupled out from or coupled into the printed circuit board, so that the printed circuit board more-or-less acts as a primary antenna. The printed circuit board is furthermore constructed in such a way that the laterally coupled-out electromagnetic waves are emitted only into a near field 8 or thereby coupled in, so that the laterally radiating printed circuit board 6 acts as a "complete" antenna only in combination with the slot-shaped housing opening 5. As can be seen from FIG. 5, the near field 8 in this case comprises at least one region between the printed circuit board 6 and a housing surface in which the slot-shaped opening 5 is formed.

The printed circuit board can be held in the housing by appropriate holding elements, such as rails, in a position necessary for the slot-shaped opening of the housing.

LIST OF REFERENCE SIGNS

1*a*, 1*b* Cable
2 Housing
2*a*, 2*b* Signal line
3 Electromagnetic waves
4 Primary antenna
5 Slot-shaped housing opening(s)
6 Printed circuit board
7 Field device
8 Near field
9 Far field
10 Round-trip delay element
11 Transmitting/receiving unit
12 Electrically non-conductive material
13 Cable infeed
14 Cable outfeed
L, L1-L4 Length of the slot-shaped housing opening
B Width of the slot-shaped housing opening
DC Dielectric constant of the electrically non-conductive material or (material-dependent) relative permittivity
λ Wavelength of the electromagnetic waves
U1, U2 Outer circumferences of the housing

The invention claimed is:

1. A field device adapter for wireless data transmission, comprising:
- an apparatus, including:
  - an at least partially metallic housing;
  - a transmitting/receiving unit for generating and receiving electromagnetic waves of a particular wavelength, wherein the transmitting/receiving unit is arranged in the at least partially metallic housing;
  - a primary antenna for coupling out the generated electromagnetic waves of the transmitting/receiving unit and for coupling in and transferring received electromagnetic waves to the transmitting/receiving unit, wherein the primary antenna is arranged in the at least partially metallic housing;
  - at least one slot-shaped housing opening that is constructed having a length that is an integer multiple of a quarter wavelength of the particular wavelength so that the at least one slot-shaped housing opening, in cooperation with the primary antenna, transfers the signals into or out of the at least partially metallic housing with the aid of the electromagnetic waves; and
  - a printed circuit board arranged within the at least partially metallic housing and constructed as the primary antenna for coupling out the generated electromagnetic waves of the transmitting/receiving unit and for coupling in and transferring received electromagnetic waves, wherein the electromagnetic waves are coupled out or coupled in laterally from the printed circuit board and the electromagnetic waves are coupled out or coupled in only in a near field and are coupled out or coupled in a far field only in combination with the at least one slot-shaped housing opening, wherein the printed circuit board is arranged such that a lateral edge of the printed circuit board is adjacent to the at least one slot-shaped housing opening for coupling out and coupling in the electromagnetic waves in the far field in combination with the at least one slot-shaped housing opening, and wherein the at least one slot-shaped housing opening is filled with an electrically non-conductive material other than air;

an adapter housing having a first end face and a second end face;

a first two-wire interface disposed at the first end face and configured to connect with a field device; and a second two-wire interface disposed at the second end face and configured to connect with a higher-order unit, wherein the first two-wire interface is a 4-20 mA interface and the second two-wire interface is a 4-20 mA interface, wherein the field device adapter is configured to convert a HART protocol present on the first two-wire interface into a first wireless transmission and transmit the first wireless transmission via the primary antenna, wherein the field device adapter is further configured to receive a second wireless transmission via the primary antenna and transmit the second wireless transmission via the HART protocol on the first two-wire interface, and wherein the adapter housing of the field device adapter includes the apparatus housing.

2. The field device adapter according to claim 1, wherein the length of the at least one slot-shaped housing opening is an integer multiple of the quarter wavelength of the particular wavelength divided by a square root of a dielectric constant of the electrically non-conductive material.

3. The field device adapter according to claim 1, wherein the at least partially metallic housing has, with the exception of the at least one slot-shaped housing opening and possible cable infeeds and/or outfeeds, a housing shape that is, on the outside, self-contained.

4. The field device adapter according to claim 1, wherein the at least partially metallic housing has round edges in cross-section at least in one section, wherein the at least one slot-shaped housing opening is arranged in the section.

5. The field device adapter according to claim 1, wherein the at least partially metallic housing is constructed to have at least two circumferences measured in two spatial directions, each circumference corresponding to an integer multiple of a half wavelength of the particular wavelength, wherein each circumference passes through the at least one slot-shaped housing opening at a midpoint of the at least one slot-shaped housing opening.

6. The field device adapter according to claim 1, wherein, on an outer surface of the at least partially metallic housing, at least one round-trip delay element is constructed to delay the electromagnetic waves by one round-trip time.

7. The field device adapter according to claim 6, wherein the at least one round-trip delay element has a groove-shaped or a punctiform structure, or is constructed from a different material than the at least partially metallic housing.

8. The field device adapter according to claim 1, wherein the at least partially metallic housing is constructed substantially from a metallic material.

9. The field device adapter according to claim 1, wherein the at least partially metallic housing is constructed from a plastic, and the at least partially metallic housing at least partially has a metallic cladding on an inner surface.

10. The field device adapter according to claim 1, wherein the adapter housing is metal, has a cylindrical cross section, and is embodied for explosion-endangered (Ex) areas.

11. An automation technology field device comprising:

an apparatus, including:

an at least partially metallic housing having a first end face and a second end face;

a transmitting/receiving unit for generating and receiving electromagnetic waves of a particular wavelength, wherein the transmitting/receiving unit is arranged in the at least partially metallic housing;

a primary antenna for coupling out the generated electromagnetic waves of the transmitting/receiving unit and for coupling in and transferring received electromagnetic waves to the transmitting/receiving unit, wherein the primary antenna is arranged in the at least partially metallic housing;

at least one slot-shaped housing opening that is constructed having a length that is an integer multiple of a quarter wavelength of the particular wavelength so that the at least one slot-shaped housing opening, in cooperation with the primary antenna, transfers the signals into or out of the at least partially metallic housing with the aid of the electromagnetic waves;

a printed circuit board arranged within the at least partially metallic housing and constructed as the primary antenna for coupling out the generated electromagnetic waves of the transmitting/receiving unit and for coupling in and transferring received electromagnetic waves;

a first two-wire interface disposed at the first end face and configured to connect with the field device; and a second two-wire interface disposed at the second end face and configured to connect with a higher-order unit, wherein the first two-wire interface is a 4-20 mA interface and the second two-wire interface is a 4-20 mA interface, wherein the electromagnetic waves are coupled out or coupled in laterally from the printed circuit board and the electromagnetic waves are coupled out or coupled in only in a near field and are coupled out or coupled in a far field only in combination with the at least one slot-shaped housing opening, wherein the printed circuit board is arranged such that a lateral edge of the printed circuit board is adjacent to the at least one slot-shaped housing opening for coupling out and coupling in the electromagnetic waves in the far field in combination with the at least one slot-shaped housing opening, wherein the apparatus is configured to convert a HART protocol present on the first two-wire interface into a first wireless transmission and transmit the first wireless transmission via the primary antenna, wherein the apparatus is further configured to receive a second wireless transmission via the primary antenna and transmit the second wireless transmission via the HART protocol on the first two-wire interface, and wherein the at least one slot-shaped housing opening is filled with an electrically non-conductive material other than air; and a field device housing, wherein the field device housing of the field device includes the apparatus housing, at least in one section.

12. The field device according to claim 11, wherein the at least one section comprises at least one cable feedthrough of the field device.

13. A field device adapter for wireless data transmission, comprising:

an apparatus, including:

an at least partially metallic housing;

a transmitting/receiving unit for generating and receiving electromagnetic waves of a particular wavelength, wherein the transmitting/receiving unit is arranged in the at least partially metallic housing;

a primary antenna for coupling out the generated electromagnetic waves of the transmitting/receiving unit and for coupling in and transferring received electromagnetic waves to the transmitting/receiving unit, wherein the primary antenna is arranged in the at least partially metallic housing;

at least one slot-shaped housing opening that is constructed having a length that is an integer multiple of a quarter wavelength of the particular wavelength so that the at least one slot-shaped housing opening, in cooperation with the primary antenna, transfers the signals into or out of the at least partially metallic housing with the aid of the electromagnetic waves; and a printed circuit board arranged within the at least partially metallic housing and constructed as the primary antenna for coupling out the generated electromagnetic waves of the transmitting/receiving unit and for coupling in and transferring received electromagnetic waves, wherein the electromagnetic waves are coupled out or coupled in laterally from the printed circuit board and the electromagnetic waves are coupled out or coupled in only in a near field and are coupled out or coupled in a far field only in combination with the at least one slot-shaped housing opening, wherein the printed circuit board is arranged such that a lateral edge of the printed circuit board is adjacent to the at least one slot-shaped housing opening for coupling out and coupling in the electromagnetic waves in the far field in combination with the at least one slot-shaped housing opening, and wherein the at least one slot-shaped housing opening is filled with an electrically non-conductive material other than air;

an adapter housing having a first end face and a second end face;

a first two-wire interface disposed at the first end face and configured to connect with a field device; and a second two-wire interface disposed at the second end face and configured to connect with a higher-order unit, wherein the first two-wire interface is a 4-20 mA interface and the second two-wire interface is a 4-20 mA interface, wherein the adapter housing of the field device adapter includes the apparatus housing, and wherein the first end face includes a threaded connection embodied to mechanically connect the field device adapter with a cable gland of the field device.

* * * * *